United States Patent
Delgo et al.

(10) Patent No.: US 12,411,880 B2
(45) Date of Patent: Sep. 9, 2025

(54) INTELLIGENT MATCHING SYSTEM WITH ONTOLOGY-AIDED RELATION EXTRACTION

(71) Applicant: Globality, Inc., Menlo Park, CA (US)

(72) Inventors: Lior Delgo, Los Altos, CA (US); Adam Ever-Hadani, San Francisco, CA (US); Ran Harpaz, Los Altos, CA (US)

(73) Assignee: Globality, Inc., Palo Alto, CA (US)

( * ) Notice: Subject to any disclaimer, the term of this patent is extended or adjusted under 35 U.S.C. 154(b) by 585 days.

(21) Appl. No.: 15/435,070

(22) Filed: Feb. 16, 2017

(65) Prior Publication Data

US 2018/0232443 A1   Aug. 16, 2018

(51) Int. Cl.
| | |
|---|---|
| *G06F 16/332* | (2025.01) |
| *G06F 16/31* | (2019.01) |
| *G06F 16/334* | (2025.01) |
| *G06F 16/35* | (2019.01) |
| *G06F 16/36* | (2019.01) |
| *G06F 16/901* | (2019.01) |
| *G06F 40/295* | (2020.01) |
| *G06Q 30/06* | (2023.01) |

(52) U.S. Cl.
CPC ............ *G06F 16/35* (2019.01); *G06F 16/322* (2019.01); *G06F 16/334* (2019.01); *G06F 16/367* (2019.01); *G06F 16/9024* (2019.01); *G06F 40/295* (2020.01); *G06Q 30/06* (2013.01)

(58) Field of Classification Search
CPC ... G10L 15/26; G10L 15/1815; G10L 15/005; G10L 15/063; G10L 2015/088
USPC ........ 707/603, 708, 755, 771, 798, E17.011, 707/E17.048, E17.099, E17.079
See application file for complete search history.

(56) References Cited

U.S. PATENT DOCUMENTS

| | | | | |
|---|---|---|---|---|
| 8,874,477 | B2* | 10/2014 | Hoffberg | G06Q 20/40 705/37 |
| 8,892,446 | B2* | 11/2014 | Cheyer | G10L 21/06 704/251 |
| 8,918,431 | B2 | 12/2014 | Mark et al. | |
| 9,082,082 | B2* | 7/2015 | Jebara | G06Q 50/00 |
| 9,152,623 | B2* | 10/2015 | Wroczy | G06F 40/55 |
| 9,183,501 | B2 | 11/2015 | Bentley et al. | |

(Continued)

OTHER PUBLICATIONS

Hedden, H., The Accidental Taxonimist, Chapter 1 "What are Taxonomies?," Information Today, Inc., May 3, 2010, pp. 1-38.

(Continued)

*Primary Examiner* — Tony Mahmoudi
*Assistant Examiner* — Linh Black
(74) *Attorney, Agent, or Firm* — UNGERMAN IP PLLC; Mark E Ungerman

(57) ABSTRACT

An intelligent matching system network architecture with a software driven engine may establish one or more matches between properties attributed to an entity, for example, a service provider and a set of specified parameters, for example, the request properties of a customer. The system analyzes user provided free-form text to generate an automated match of requirements specified by a user and a prospective service provider. One or more service providers which are good matches for filling a specified set of parameters, for example, parameters specifying customer requirements or needs derived at least in part from user input are identified.

8 Claims, 10 Drawing Sheets

(56) References Cited

U.S. PATENT DOCUMENTS

| | | | |
|---|---|---|---|
| 9,214,191 B2 | 12/2015 | Guzik | |
| 9,262,406 B1* | 2/2016 | Das | G06F 40/151 |
| 9,318,108 B2* | 4/2016 | Gruber | G10L 15/26 |
| 9,368,114 B2* | 6/2016 | Larson | G06F 3/165 |
| 9,501,565 B1* | 11/2016 | Ajmera | G06N 7/01 |
| 9,582,608 B2* | 2/2017 | Bellegarda | G06F 16/90324 |
| 9,633,004 B2* | 4/2017 | Giuli | G10L 15/22 |
| 9,646,609 B2* | 5/2017 | Naik | G10L 15/005 |
| 9,678,949 B2* | 6/2017 | Monk, II | G06F 40/30 |
| 9,697,822 B1* | 7/2017 | Naik | G10L 15/22 |
| 9,792,277 B2* | 10/2017 | Srinivasan | G06F 40/30 |
| 9,830,315 B1* | 11/2017 | Xiao | G06F 40/30 |
| 9,922,642 B2* | 3/2018 | Pitschel | G10L 15/063 |
| 9,971,774 B2* | 5/2018 | Badaskar | G06F 16/432 |
| 10,162,882 B2* | 12/2018 | Franceschini | G06F 16/313 |
| 10,176,167 B2* | 1/2019 | Evermann | G06F 40/35 |
| 10,276,170 B2* | 4/2019 | Gruber | G10L 15/22 |
| 10,296,586 B2* | 5/2019 | Singh | G06F 16/29 |
| 10,339,440 B2* | 7/2019 | Trask | G06N 3/02 |
| 10,395,118 B2* | 8/2019 | Yu | G06N 3/084 |
| 10,509,862 B2* | 12/2019 | Wang | G06F 40/274 |
| 10,521,466 B2* | 12/2019 | Bellegarda | G06F 3/16 |
| 10,565,504 B2* | 2/2020 | Lindsley | G06N 5/04 |
| 10,606,846 B2* | 3/2020 | Li | G06N 7/005 |
| 11,030,515 B2* | 6/2021 | Kaufmann | G06F 40/56 |
| 2005/0120114 A1* | 6/2005 | Nadamoto | G06F 16/957 709/225 |
| 2007/0033221 A1* | 2/2007 | Copperman | G06F 16/367 |
| 2010/0070448 A1* | 3/2010 | Omoigui | H01L 27/14647 706/47 |
| 2010/0228693 A1* | 9/2010 | Dawson | G06N 5/022 707/769 |
| 2010/0254874 A1* | 10/2010 | Mahieu | B01D 53/83 423/247 |
| 2011/0066587 A1 | 3/2011 | Ferrucci et al. | |
| 2011/0196670 A1 | 8/2011 | Dang et al. | |
| 2012/0078889 A1 | 3/2012 | Chu-Carroll et al. | |
| 2012/0150532 A1* | 6/2012 | Mirowski | G06F 40/40 704/E11.001 |
| 2012/0158633 A1* | 6/2012 | Eder | G06N 5/022 706/46 |
| 2012/0254143 A1 | 10/2012 | Varma et al. | |
| 2012/0330869 A1* | 12/2012 | Durham | G06N 5/022 706/16 |
| 2012/0330921 A1 | 12/2012 | Ferrucci et al. | |
| 2013/0096947 A1* | 4/2013 | Shah | G16H 10/60 705/3 |
| 2013/0110573 A1* | 5/2013 | Pye | G06Q 10/06 705/7.23 |
| 2013/0325442 A1* | 12/2013 | Dahlmeier | G06F 17/274 704/9 |
| 2014/0025660 A1* | 1/2014 | Mohammed | G06Q 30/0241 707/722 |
| 2014/0108006 A1* | 4/2014 | Vogel | G06F 17/28 704/9 |
| 2014/0236578 A1* | 8/2014 | Malon | G06F 40/40 704/9 |
| 2014/0258316 A1 | 9/2014 | O'Hagan et al. | |
| 2014/0297268 A1* | 10/2014 | Govrin | G06N 5/02 704/9 |
| 2015/0032443 A1* | 1/2015 | Karov | G06F 40/35 704/9 |
| 2015/0066895 A1* | 3/2015 | Komissarchik | G06V 30/413 707/709 |
| 2015/0347480 A1* | 12/2015 | Smart | G06F 16/2237 707/743 |
| 2016/0110433 A1* | 4/2016 | Sawhney | G06F 40/30 707/722 |
| 2016/0180041 A1* | 6/2016 | Pestian | G16H 20/40 705/2 |
| 2016/0350288 A1* | 12/2016 | Wick | G06F 40/44 |
| 2017/0017635 A1* | 1/2017 | Leliwa | G06F 40/258 |
| 2017/0075877 A1* | 3/2017 | Lepeltier | G06F 40/117 |
| 2017/0098153 A1* | 4/2017 | Mao | G06N 3/0454 |
| 2017/0177715 A1* | 6/2017 | Chang | G06F 40/186 |
| 2017/0235848 A1* | 8/2017 | Van Dusen | H04L 41/04 705/12 |
| 2018/0075070 A1* | 3/2018 | Chandrasekaran | G06F 16/367 |
| 2018/0089383 A1* | 3/2018 | Allen | G16H 15/00 |
| 2018/0113867 A1* | 4/2018 | Erpenbach | G06F 40/10 |
| 2018/0182381 A1* | 6/2018 | Singh | G06Q 30/0202 |
| 2018/0189634 A1* | 7/2018 | Abdelaziz | G06N 5/022 |
| 2018/0203848 A1* | 7/2018 | Perez | G10L 25/30 |
| 2018/0232443 A1* | 8/2018 | Delgo | G06F 16/35 |
| 2019/0005395 A1* | 1/2019 | Dutkowski | G06T 11/206 |

OTHER PUBLICATIONS

Mikolov, T., Sutskever, I., Chen, K., Corrado, G., & Dean, J. (2013). "Distributed Representations of Words and Phrases and their Compositionality," in Advances in Neural Information Processing Systems, pp. 3111-3119.

Pennington, J., Socher, R., & Manning, C., (Oct. 2004). "GloVe: Global Vectors for Word Representation," Computer Science Department, Stanford University, Stanford, CA, in EMNLP (vol. 14, pp. 1532-1543).

Speer, R. & Chin, J. (2016). "An Ensemble Method to Produce High-Quality Word Embeddings," arXiv preprint arXiv:1604.01692.

Andor, D., Alberti, C., Weiss, D., Severyn, A., Presta, A., Ganchez, K., Petrov, S. & Collins, M. (2016). "Globally Normalized Transition-Based Neural Networks," arXIV preprint arXiv:1603.06042.

Lescovec, J., Rajaraman, A. & Ullman, J.D. (2014). Mining of Massive Datasets, Chapter 3. "Finding Similar Items," pp. 73-130, Cambridge University Press.

Lafferty, J., McCallum, A., & Pereira, F., "Conditional Random Fields: Probabilistic Models for Segmenting and Labeling Sequence Data," Jun. 2001. Proceedings of the 18th International Conference on Machine Learning 2001 (ICML 2001), pp. 282-289.

Universal Dependencies, http://universaldependencies.org/u/dep/index.html, retrieved Nov. 23, 2016.

Shillingford, B., "Practical 6: LSTMs for language modeling," Jul. 6, 2016, University of Oxford Machine Learning Class, pp. 1-5.

Relation Extraction—Deep Dive, http://deepdive.standford.edu/relation_extraction, retrieved Jan. 11, 2017.

Ontology—Wikipedia, https://en.wikipedia.org/wiki/Ontology, retrieved Nov. 7, 2016.

Ontology (information science)—Wikipedia, https://en.wikipedia.org/wiki/Ontology_(information_science), retrieved Nov. 23, 2016.

Taxonomy (general)—Wikipedia, https://en.wikipedia.org/wiki/Taxonomy_(general), retrieved Jan. 13, 2017.

Wikipedia: Database download—Wikipedia, https://en.wikipedia.org/wiki/Wikipedia:Database_download, retrieved Nov. 23, 2016.

* cited by examiner

INTELLIGENT MATCHING SYSTEM WITH ONTOLOGY-AIDED RELATION EXTRACTION

BACKGROUND OF THE INVENTION

1. Field of the Invention

The invention relates to a software driven engine and process, and particularly to an innovative, interactive network-based system which may be used in matching or ranking a correlation between one or more entities each having associated properties to a set of parameters. One application is for use in managing service procurement.

2. Description of the Related Technology

In computer science and information science, an ontology is a formal naming and definition of the types, properties, and interrelationships of the entities that really or fundamentally exist for a particular domain of discourse. It is thus a practical application of philosophical ontology, with a taxonomy. An ontology compartmentalizes the variables needed for some set of computations and establishes the relationships between them. Taxonomy is the practice and science of classification. The word is also used as a count noun: a taxonomy, or taxonomic scheme, is a particular classification. Taxonomy may refer to a classification of things or concepts, as well as to the principals underlying such classification.

U.S. Pat. No. 8,918,431 B2 entitled, Adaptive Ontology, expressly incorporated by reference herein, shows a system, method and apparatus directed towards enabling a virtual personal assistant to adapt its ontology and hence improve its efficiency to service a user's query. Adaptive ontology provides a method and mechanism for ontologies to adapt to each specific user of the system.

U.S. Pat. No. 9,183,501 B2 entitled, Upper Merged Ontology for IT Architecture, expressly incorporated by reference herein, shows an upper merged ontology which supports knowledge representation and functionality for maintenance, constraint processing and reasoning from specialist ontologies. It relates to an information technology (IT) architecture including four principal components, namely, an upper merged ontology, an upper merged ontology knowledge base, semantic web applications and a reasoning and constraint language (RaCL).

SUMMARY OF THE INVENTION

The intelligent matching system is a network architecture with a software driven engine that establishes one or more matches between properties attributed to an entity, for example, a service provider and a set of specified parameters, for example, the request properties of a customer. The request properties may relate to the nature of the customer (or client) or the nature of the services being procured. Specific examples may identify industry, office locations, budget and others.

The system may analyze free-form text provided by a user to allow the system to perform automated matching between requirements specified by a user and a prospective service provider. It is an object to identify one or more service providers which are good matches for filling a specified set of parameters, for example, parameters specifying customer requirements or needs derived at least in part from user input.

A match may be determined based on scoring, and ranking of correlation between properties attributed to a service provider known to the system and user-specified inputs. This may be done by comparing structured background information (properties) obtained in advance and stored relating to service providers and structured information extracted from user input.

The service provider properties and information derived from user input may be aligned and combined in a weighted fashion to generate an overall "goodness of fit" score for each candidate service provider.

A re-ranking step may be performed where the top N candidates are preserved, along with meta-data describing, in human readable form, notable factors which contributed to the match score. This may be in a form suitable to be presented to one or more human experts so that they can curate this list, potentially re-ordering some entries and pruning others, resulting in a "short list" which is finally presented to the user.

The algorithms used in the matching system may include a text-to-ontology mapping.

A text-to-ontology mapping is a method for automatic extraction of structured information from free-form text provided by a user. The steps of a text-to-ontology mapping method may include:

a. Defining a knowledge graph and an associated ontology, facilitating the curation of a taxonomy of named entities, along with their relations and associated meta-data;

b. Defining a contextual ontology, facilitating a structured representation of all parameters of interest in a particular free-form text input context;

c. Associating a set of language-specific text-matching attributes with certain nodes in the ontologies and the knowledge graph, in the form of semantically-meaningful dense word embedding vectors;

d. Performing named entity recognition and named entity linking on the user-provided text to associate parts of the text with known named entities described in the knowledge graph;

e. Analyzing the text provided by the user, by performing part-of-speech tagging and dependency parsing on the text;

f. Performing a semantic parsing of the text, extracting semantic relations by traversing a dependency parsed tree and applying a classifier which is used to detect mappings between certain phrases in the text and nodes in the contextual ontology; and g. Processing the candidate named entity to ontology associations in a re-sorting phase to resolve ambiguities and prune certain matches, in order to arrive at a final context-specific structured representation of the information provided by the user in text.

Various objects, features, aspects, and advantages of the present invention will become more apparent from the following detailed description of preferred embodiments of the invention, along with the accompanying drawings in which like numerals represent like components.

Moreover, the above objects and advantages of the invention are illustrative, and not exhaustive, of those that can be achieved by the invention. Thus, these and other objects and advantages of the invention will be apparent from the description herein, both as embodied herein and as modified in view of any variations which will be apparent to those skilled in the art.

DETAILED DESCRIPTION OF THE PREFERRED EMBODIMENT

Figure 1:
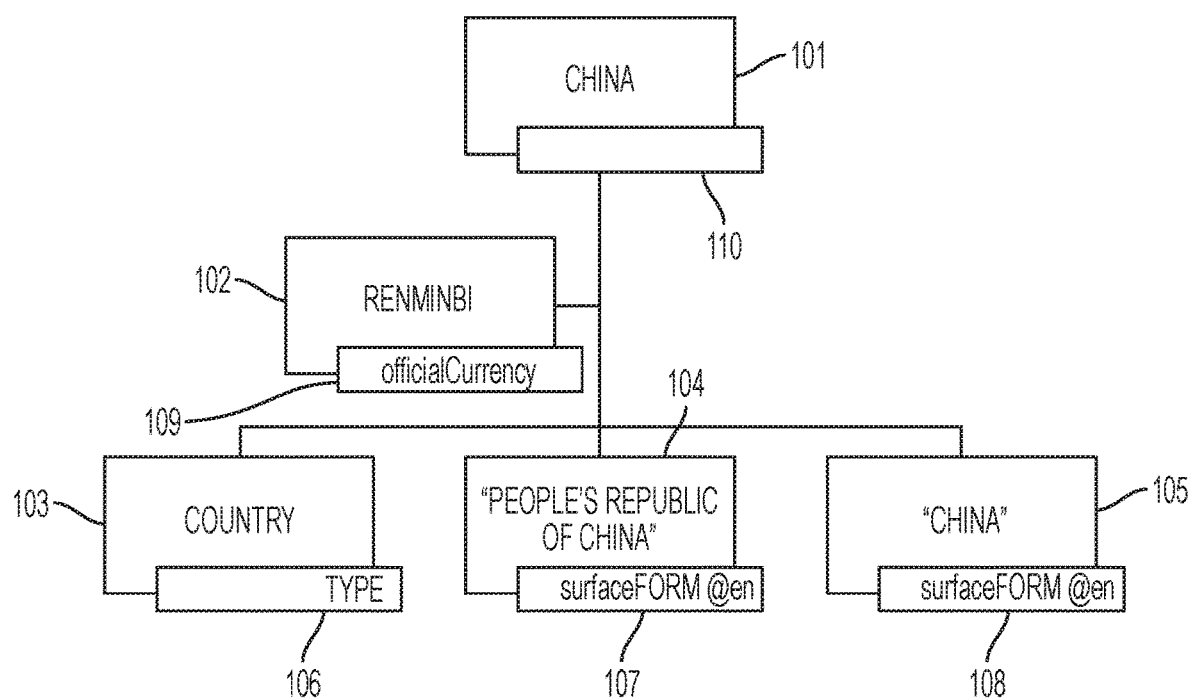
FIG. 1 shows an excerpt from a knowledge graph.

A matching process according to an embodiment may be applied to a request for proposal process (RFP), such as may be implemented when a customer/consumer solicits vendor proposals for goods and/or services. As used herein, a "Project Brief" refers to an interactive machine-guided process for matching service providers to user requirements. As part of the Project Brief, certain questions may be presented to the user. The user may give responses as free-form text. Examples of questions for a Project Brief could be "Please provide a brief description of your company," "Please provide a brief overview of your project requirements" and others of this sort. A text-to-ontology mapping algorithm may be used to extract structured information from the freeform text responses.

The purposes of the text-to-ontology mapping may include:

a. Reduce or eliminate the need for additional information to achieve a threshold matching score. When needed, additional information may be solicited by generating follow-up questions asking the user for specific information, e.g. "Where are your main offices located", "What are the main industries in which you operate", "What is the expected duration of the engagement".

b. Automatically navigate to and present the user with relevant follow up questions by analyzing the structured information extracted from the text, and predicting the most likely "solution" that is required. For example, a user describing, in free-form text, a need for "achieving LEED certification status" may be automatically navigated to the relevant service type in a curated taxonomy of service types (In this example case, Environmental→Building→Certification). Follow up questions (from a pre-existing repository of human editor-created questions) may be presented which are specific to this solution requirement.

c. Present dynamically-generated questions which are generated based on business logic rules defined over a certain set of contextual cues. Knowledge graph-based association mining for dynamic question generation" described in more detail below may be used to accomplish this objective.

A network server may be provided to:

a. extract named entities of interest from free-form text given in response to a particular Project Brief question;

b. ascertain the semantic relations between the extracted entities and other constituents of the sentence signifying an action (predicate) and a subject.

c. map these semantic relations to parameters of interest in a contextual ontology which may be associated with the question for which the free-form text answer was provided. In the context of the Project Brief these contextual ontologies primarily consist of a representation of the Client Company, the Service Provider Company, and The Project itself. The contextual ontology is a graph-based representation which describes properties of interest for each defined entity. For example, the Client Company object may have an edge linking it to properties such as "office location", "industry", "founding year". The Project object may have an edge linking it to properties such as "budget", "timeline". Notably, each object may be associated with multiple value assignments for such properties—so that multiple instantiations of a 'budget' property can be associated with a project, which may designate budget for different aspects of the project.

These steps are performed to identify a best fit between the various properties associated with the contextual ontology, and between named entities and their associated semantic relations, which are identified in the text.

The system may include a knowledge graph in the form of a graph with nodes representing certain entities of interest, and their properties. For example, a node could represent the country China, or a Project Identification, or a hypothetical Office Location property. Edges in the graph may represent connections of interest between the different entities and their properties. For example, an edge would associate a node representing a Service Provider Company, and the node(s) representing its Office Location property, or (one or more) nodes representing the Industry in which the company operates (e.g. by way of NAICS industry codes). FIG. 1 shows an example of a knowledge graph. Each node 101, 102, 103, 104, and 105 may correspond to a concrete entity or to a property value assignment for it. Edges are the connections between the nodes and represent assertions made about the associations between entities and properties. Edge labels 106, 107, 108, 109, and 110 are given by text boxes shown in FIG. 1. In this case, the entity China 101 has a type 106 of Country 103; is connected to the entity Renminbi 102 which itself has a type of Currency 109; and is connected to the surface Form property values 107 and 108 "People's Republic of China" 104, and "China" 105. Each node may also be associated with a unique identifier in the form of a URI.

Multiple knowledge graphs may be constructed for different purposes. For example, a global knowledge graph which indexes a large universe of named entities, notably all countries, cities, languages, currencies, and service procurement industries and service types, e.g. as specified in international services taxonomy standards such as NAICS may be a useful knowledge graph.

Figure 2:
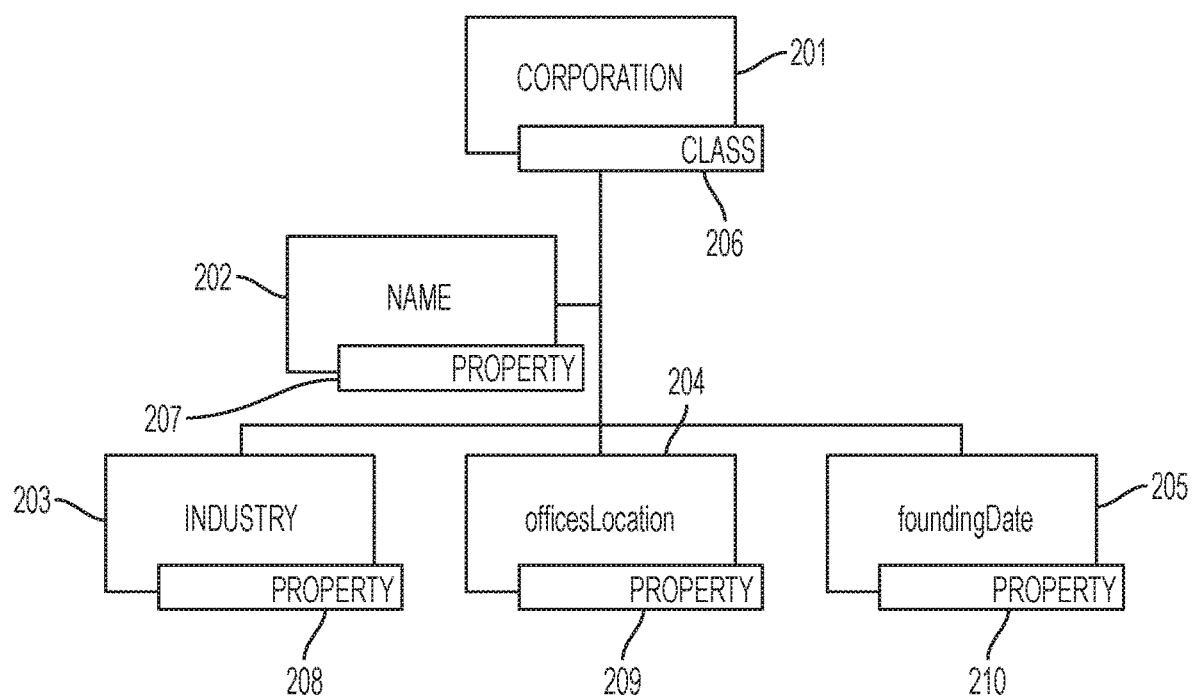
FIG. 2 shows an excerpt of a global ontology graph.

FIG. 2 shows an ontology expressed as a schema which specifies the types of entities that may be represented in the knowledge graph, as well the various properties they may take on, and the different connections that may appear between these entities, in the knowledge graph. The ontology can in itself be visualized as a graph. Each node 201, 202, 203, 204, and 205 may correspond to a Class type or a Property type, and edges dictate valid correspondences between Classes 206 and Properties 207, 208, 209, and 210. Properties may define a range specification which dictates which type of entities or literal values may be "pointed to"

by a value assignment for this property. In the above example, the "officesLocation" 204 property 209 could have a range value of Country, meaning that a legal value assignment of this property would comprise of pointing to another entity of type Country. Additionally, nodes in this graph may be associated with arbitrary meta-data, e.g. word embedding vectors which could be used as part of the text-to-ontology mapping process described in the text.

A property in an ontology (and for which particular instantiations may be realized in objects represented in a knowledge graph corresponding to the ontology in which it was defined) may be associated with a range. This is a specification of valid types of entities which may be pointed to by the property. For example, a Project entity type may be defined in an ontology, as well as a Country entity type. The Project entity type may then have a property defined for it called "servicesLocation" for which a range is specified as Country, to mean a valid value assignment for this property would consist of any entity of type Country.

Inheritance relationships may exist in the various ontology definitions. These carry semantic meaning for practical purposes; For example, a Place entity may be defined, and subsequently a set of entities may be defined such as Country, City, State, which are defined as sub classes ("subClassOf") of the Place entity. The significance of this is that in subsequent property definitions, any subclass of a type defined as the range of the property may constitute a valid assignment. That is, if a property "officesLocation" is defined with a range of Place, then an entity of a type subclassing Place (e.g. Country, City, and State in the above example) will be considered a valid assignment.

A knowledge graph may rely on a global ontology or a local ontology. A local ontology may be a contextual ontology constructed of a smaller set of entities and properties derived from the entities and properties defined in the global ontology. For example, a contextual ontology which defines a 'ServiceProvider' entity type as a subclass of a 'Corporation' type defined in the global ontology. A subclass relation endows the child object with all properties and relations associated with the parent object. In this example, the 'ServiceProvider' entity has 'officesLocation' property if one was defined for the 'Corporation' entity in the global ontology. A contextual ontology is limited to entities and relations of interest in the specific context of a particular question (or set of questions) the Project Brief.

Each node in an ontology graph, or in the knowledge graph, may be endowed with certain surface form attributes. These may include a dense word embedding vector (or a list of word embedding vectors), which, itself can be an average of multiple word vectors, indicating the "head word" or "predicate" associated with this entity, in a specified human language. For example, an entity in the ontology representing the concept of "Place" may be associated with a word embedding vector which is the (component-wise) average of the word embedding vectors for the words "located", "headquartered", "based", "grounded". Other mechanisms may be used, for example, a more structured approach using classification. This association would be further denoted as relevant to the "English" language, so that a node may be associated with multiple such word embedding vectors, for use with different languages. Various methods exist to obtain such word embedding vectors, see Mikolov, T., Sutskever, I., Chen, K., Corrado, G. & Dean, J. (n.d.). Distributed Representations of Words and Phrases and their Compositionality, Neural Information Processing Systems Proceedings, 1-9 (2013); Pennington, J., Socher, R.; & Manning, C. (2014), Glove: Global Vectors for Word Representation.

(2014); Proceedings of the 2014 Conference on Empirical Methods in Natural Language Processing (EMNLP); Speer; R. & Chin, J. (2016), An Ensemble Method to Produce High-Quality Word Embeddings. 1-12., Cornell University Library, the disclosure of which are expressly incorporated by reference herein. According to one embodiment, the word embedding vector may be an aggregate statistic of word vectors, such as an average. In another embodiment, a classifier may be trained on labeled examples of word embedding vectors to arrive at a decision boundary which may be used for ascertaining whether a query word embedding vector matches well with the corresponding headword predicate.

With these constituents in place, the following operations may be performed on the free-form text answers given to certain set of designated questions as part of the Project Brief:

1. A Named Entity Recognition ("NER") and Named Entity Linking ("NEL") may be conducted to match up named entities of interest against the global knowledge graph. This process will produce a set of candidate entities, their token position in the original text, along with their respective meta-data from the knowledge graph. Specifically, the type for each one as specified in the knowledge graph. Named entity recognition and linking for text-to-ontology mapping may be required. As part of the text-to-ontology mapping, a mechanism to associate phrases from the text ("Chunks"), with known named entities which are represented in the knowledge graph may be performed.

2. On a continuous basis, human editors may identify named entities which a priori are deemed significant and that we wish to be able to locate in text in subsequent Project Brief instances. These entities may be added to the knowledge graph, along with meta-data such as a type, which corresponds to a type defined in the ontology. Further, each such named entity may be given one or more associated surface forms which may be denoted with a human language to which they pertain. For example, the entity "United States" of type "Country" may be associated with multiple surface forms for the language "English": "United States", "U.S.A", "U.S.", "America".

3. In runtime, a software component may traverse all entities stored in the knowledge graph, and index all the named entity surface forms. According to an embodiment, the Aho-Corasick algorithm may be used to build an efficient string matching automaton associating each string in the created automaton with the unique URI identifier for the associated entity. The surface forms may be subject to some normalization before being indexed, for example by lower casing all characters and contracting all sequences of whitespace character to a single character.

4. Named entity recognition and linking on a free-form text supplied by the user as part of the project brief may first perform tokenization, and part-of-speech (POS) analysis and tagging on the text. POS tagging can be done in various ways, for example using a trained Conditional Random Field (CRF) model, Lafferty, J., McCallum, A., & Pereira, F. C. (2001). Conditional Random Fields: Probabilistic Models for Segmenting and Labeling Sequence Data, Proceedings of the 18th International Conference on Machine Learning 2001 (ICML 2001), 282-289, the disclosures of which is expressly incorporated by reference herein.

5. With each word token in the original text now associated with a POS tag, shallow parsing, or chunking, on the POS-tagged text may be performed. This may include identifying specific pattern sequences of part-of-speech tags appearing in the text, for example a pattern may be specified as "{<NN.*|JJ>*<NN.*>}" to mean any sequence of nouns or adjectives, terminated by a noun. A small set of such patterns defined recursively as candidate phrases may be manually identified.
6. For each candidate phrase identified in the text, the phrase text may be normalized in similar fashion to the normalization carried out in step 2, and the automaton constructed may be queried in step 2 using the Aho-Corasick algorithm, with the candidate phrase. In the case where any entity that was indexed is mentioned, this will result in a match which will return the unique URI identifier for that entity. It is then possible to retrieve all of its associated meta-data from the knowledge graph, such as its type, and any other properties or connections it may have to other entities.

Variations on the above method may be employed to support disambiguation and fuzzy matching between named entities and free-form text. These are outlined in the following.

A hierarchy of string matching algorithms, conditional on certain features of the input text may be used to supporting fuzzy matching, i.e. allowing for minor spelling variations (or mistakes), in the way certain surface forms associated with named entities may appear in user provided text, while still being able to match them.

1. If the input text is below a certain length threshold L and/or below a certain token (word) count threshold W, an index comprising of character-level k-shingles, constructed from the named entity surface forms may be consulted. These may be defined as string subsequences of length k (typical choice of k is in the range of [3,5]). For example, in the string "United States", the following character level k-shingles for k=4 may appear, after normalization of text as described previously: ["unit", "nite", "ited", "ted", "ed s", "d est", . . . ]
2. If the input text is above a certain token (word) count threshold W, a word-level k-shingles index constructed from the named entity surface forms may be consulted. These are the word-level equivalent of the above defined character level k-shingles. For example, for the text "United States of America", for k=2 and after normalization the resulting word-level k-shingles would be: ["united states", "states of", "of America"]. Typical choice of k in this case is in the range [2,3].
3. In both cases, the appropriate k-shingles (character level or word level) are extracted from the user provided text, and are then used to query the appropriate index. Items in the index corresponding to named entity surface forms may be evaluated based on their Jaccard set similarity distance to the k-shingles extracted from the user text. All matches above a certain similarity threshold T are then returned as candidates, along with the similarity score that was obtained for them. The threshold T may be different when using in conjunction with word-level k-shingles and with character-level k-shingles.
4. For processing queries more efficiently, locality-sensitive hashing (LSH) techniques may be employed on top of the k-shingles. See Rajaraman, A., & Ullman, J. D. (2012). *Mining of Massive Datasets, Chapt.* 3 *Finding Similar Items.* New York, NY: Cambridge University Press, the disclosure of which is expressly incorporated by reference herein, for a comprehensive description of using of k-shingles, Jaccard similarity, and LSH in finding near-duplicate items.

Disambiguation may be used in some cases, particularly when multiple candidate named entities matches may be returned corresponding to a single text phrases. For example, the phrase "in Paris" may match up against an entity corresponding to the country Paris, and an entity corresponding to the city Paris, Texas.

For resolving such ambiguities, a scoring function may assign a confidence score to each returned candidate entity match. This score may be computed as follows:

1. Each named entity in the knowledge graph may be assigned an a priori probability, P(E). In one realization, each named entity in the knowledge graph with a Wikipedia article corresponding to it. The full internal link structure of Wikipedia articles may then be analyzed. This may be done for example by using the data dumps made available by Wikipedia, Wikipedia: +Database Download. (n.d.). Retrieved Dec. 15, 2016, from Wikipedia website at the page named Database Download, the disclosure of which is expressly incorporated by reference herein, and devise a probability distribution over the articles, proportional to the number of inbound internal links associated with each topic. This may be used to establish a global a priori probability score for each topic.
2. Each surface form associated with an entity in the knowledge graph may also be given a probability score, P(S|E). This is interpreted as the conditional probability of observing the surface form S in text, for when the entity E is referenced. This probability distribution can be constructed in similar fashion to 1, by analyzing the internal link structure of Wikipedia; specifically, for each (internal) inbound link pointing to a Wikipedia article associated with a named entity, the anchor (hyperlink) text may be recorded. The maintain counts may be maintained over each (Wikipedia topic, anchor text) tuple. These counts may be normalized to obtain a probability distribution for each Wikipedia topic. For each surface form associated with the named entity corresponding to a Wikipedia topic, the following logic may be used:
   a. If a (Wikipedia topic, anchor text) tuple matching the (named entity, surface form) is found, its probability is used. The matching is done textually while potentially employing some normalization, e.g. lower casing, and removing punctuations.
   b. After the process outlined in a. is completed, some surface forms associated with a specific named entity may remain which did not correspond to an anchor text entry. For these cases, some non-zero probability may be assigned to these surface forms, and the probability distribution over all surface forms associated with the named entity may be re-normalized. To this end, the following logic may be employed:
      i. A total probability distribution over the surface forms by aggregating over all (Wikipedia topic, anchor text) tuples where anchor text matches the surface forms may be constructed and the total number of tuples may be normalized. The resulting probability may then be interpreted as the a priori probability of observing the surface form, P(S=s).
      ii. P(S=s|E) is approximated. This can be done, for example, by assigning a fixed small probability (e.g. p~10%), or we may do so in a way dependent on the existing probability distribution P(S|E), e.g. by assigning it the value min{P(S|E)}, based on the existing entries in the distribution P(S|E). Once this approximation is done, the probability distribution across all existing surface forms associated with the specific named entity may be re-normalized to account for the added probability weight.

3. Using Bayes' Law, the probability of a certain entity given a surface form as P(E|S)=P(S|E)*P(E)/P(S) may be calculated, whereby all quantities on the right-hand side are computed as outlined in the above steps. This is then used as the confidence score associated with the entity match, and the top-ranking entity is then chosen as the disambiguated match.

4. Based on the type associated to each named entity found in the text and a corresponding node in the contextual ontology which signify an entity property (as defined above), and are associated with the same range type. For example, the named entity "Austin, Texas" in the text, corresponding in the knowledge graph to an entity of type City, the ontology may be traversed to ascertain that the following candidate relations may be implied: (ServiceProvider, officesLocation), (Client, officesLocation), (Project, servicesLocation).

5. Certain words in the text which belong to a lexically closed-class, notably pronouns ("I", "We", "Our", "You", etc.), may be resolved based on the a priori known context and identity of the author. Based on this, these words, as named entities, may be mapped unto nodes in the contextual ontology. For example, knowing the author of the text is the prospective client for the project, the occurrences of subjective/objective first-person pronouns into the contextual ontology node corresponding to "Client" can be resolved.

6. Part-of-speech (POS) tagging and dependency parsing on the text may be used to obtain a labeled tree representation for the grammatical structure of each sentence in the text, establishing relationships between "head" words and words which modify those heads. See FIG. 3 for an example of how such a parse tree, annotated with POS tags, might look like. Obtaining such a dependency parse can be done using known methods as described in Andor, D., Alberti C., Weiss D., Severyn, A., Presta, A., Ganchev, K., . . . Collins, M. (2016). Globally Normalized Transition-Based Neural Networks, *Proceedings of the 54th Annual Meeting of the Association for Computational Linguistics* (*Volume 1: Long Papers*), the disclosure of which is expressly incorporated by reference herein.

Figure 3:
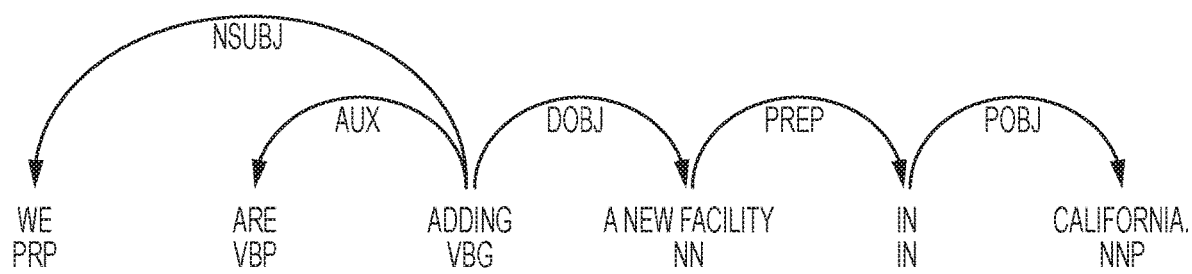
FIG. 3 shows an example of a conceptual sentence tagged and dependency-parsed based on a part-of-speech (POS)

FIG. 3 shows a part-of-speech (POS)—tagged and dependency parsed sentence would look like conceptually. Each token (word) in the original sentence is associated with a part-of-speech (POS) tag, and a full dependency parse tree is constructed, whereby each edge in the dependency parse tree is associated with a specific dependency tag, signifying the syntactic relation between the different parts of the sentence.

Figure 4:
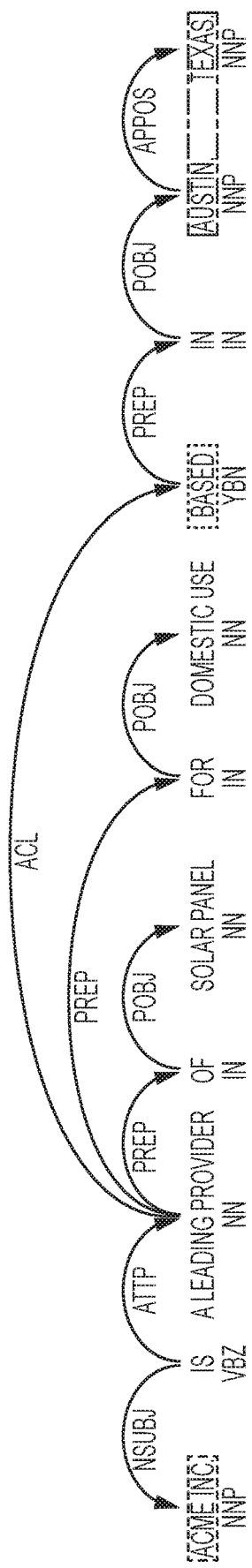
FIG. 4 shows an illustration of a process of mapping text to an ontology.

1 The dependency parse may be traversed in order:
   a. Each named entity found in step 1 is assigned one or more word embedding vectors, namely those associated with any of the contextual ontology property nodes identified in step 2 as candidate relations pertaining to this named entity.
   b. For each named entity found in step 1 a corresponding node in the dependency parse tree is identified. This node is defined to be the one which overlaps with the named entity tokens in the original text, and of minimal distance from the root of the parse tree, which also has a dependency tag label which matches a pre-defined set of labels. In one realization, this set is limited to the dependency tags "nobj", "dobj", and "iobj" (The dependency tags employed are based on the Universal Dependencies specification, see Universal Dependency Relations. (n.d.). Retrieved Dec. 15, 2016, from (http://universaldependencies.org/u/dep/index.html), the disclosure of which is expressly incorporated by reference herein.
   c. The dependency parse tree is traversed upwards from the node identified in step a., and for each word encountered along the path to the root, which has one of a few part-of-speech tags of interest (notably 'VB*', for all verbs), its associated word embedding vector is materialized. Any word (token) which is materialized over a word embedding a vector is called a candidate relation predicate.
   d. Among all candidate relation predicates identified in step c, we then find the minimum distance between any of their embedded word vectors and the word vector associated with the named entity of interest, as obtained in step a is then found. According to an embodiment cosine distance may be used to measure similarity of word embedding vectors A cut-off threshold T may be established whereby distances greater than T designate "no fit".
   e. If a candidate relation predicate is identified for which the (minimal) word embedding vector distance to one of the word embedding vectors associated with the named entity is under the threshold, we then continue the dependency parse traversal process is continued to attempt and find the subject of the candidate relation. This is done traversing to the root of the tree, and then performing back tracking, traversing down each sub-tree of the dependency tree, in breadth-first search (BFS) order, and collecting any word found which is classified as a subject above a certain pre-defined confidence score (probability) threshold. The features used to feed this classifier are minimally the presence of a dependency tag in a certain pre-specified set, and an indicator variable signifying whether the word was identified as belonging to a lexically closed word-class and resolved, based on the context, into one of the entities in the contextual ontology, as described in step 3. Typical dependency parse tree tags that would be considered as input features into this classifier are 'nsubj', and 'nsubjpass'. There may be multiple matches for the candidate relation predicate as well as for the candidate relation subject, but that the cardinality of the candidate matches is low (typically on order of 1-4). Further, tokens connected to the token found may be concatenated if they are related to it by one of a pre-specified dependency tags in the dependency parse tree.
   f. A full set of candidate relations from all found subjects, predicates, and named entities is constructed. These can be thought of as triplets of the form (subject, predicate, object), where: object would correspond to the named entity recognized; predicate would correspond to the word in the text deemed to signify a property node from the; and subject would correspond to a word (or concatenation of words) from the text found by traversing the dependency tree upwards from the predicate word and then downwards again, finding any occurrence of a particular dependency tag as described in step e.

g. For each candidate relation assembled in step f., a classifier is applied which will emit a number in the range [0, 1], signifying the probability of the existence of a true relation. This classifier can take the form of a logistic regression model, the features for which can be built in various ways; Notable features used are: the full dependency parse path between the object node and the predicate node, and between the predicate node and the subject node; The particular token in the text found as the predicate; and the number of other dependency parse tags of a certain subset of types found in the same sentence. Many other features may be used as input into the logistic regression classifier. Further, other classification models may be used; Notably, a Recurrent Neural Network (RNN), or a variant of which called Long-Short Term Memory (LSTM) may be employed to obtain a (floating-point numerical) representation of the full sequence of tokens between the relation object, predicate, and subject. This representation can then be used as another input into the logistic regression classifier. Training of the logistic regression model can be carried out based on a set of pre-annotated example sentences. If using an RNN, the parameters (weights) of the RNN may be learned jointly as part of training the logistic regression classifier. This is similar to the common practice of connecting a so-called fully-connected softmax layer to an LSTM layer in deep neural networks architectures. See Shillingford, B. (2016). Machine Learning. University of Oxford Course Materials: Practical 6, p. 1-5, the disclosure of which is expressly incorporated by reference herein, for a more technical description of this neural network architecture. FIG. 4 illustrates steps a.-g. outlined above. FIG. 4 shows an illustration of a process of mapping text to the ontology. In step 1, named entities are identified and are associated with their entries in the knowledge graph, and their type in the ontology. In this case 'Austin, Texas' was identified as an entity with a type of "City". In step 2, Part-of-speech tags and a dependency tree parse of the sentence are obtained. In step 3, the named entity is associated with a node in the dependency parse—in this case the node would be the one corresponding to the token "Austin," with a POS tag of "NNP". Then the dependency tree is traversed "upwards", until the node corresponding to the token "based", with the associated POS tag "VBN" is reached. For this node, the word embedding vector is obtained and associated with the token "based", and measure the distance to the word vector associated with the named entity "Austin, Texas" (by way of its type, "Country") is measured. In this case, the distance is deemed to be under the set threshold, and the node corresponding to the token "based" is marked as potentially signifying the "officesLocation" property of either the Client or the Service Provider. The process then continues to traverse the dependency parse tree upwards in order to find the semantic subject of the underlying candidate semantic relation "X has offices in Austin, Texas". Once the root is reached the process backtracks by descending the tree, looking for nodes pointed to by specific dependency parse tags, notably "nsubj" and "nsubjpass". Once found, the tokens associated with those nodes (potentially concatenated with tokens associated with direct descendants of specific dependency parse tags) are marked as the subject. For the example above, the full candidate semantic relation obtained would then be (Acme Inc., officesLocation, "Austin, Texas"). In a post-processing step, the process attempts to align the subjects for all candidate semantic relations with the known entities in the knowledge graph. For example, it may be known that the actor providing the text is the Client company, that the Client company name is "Acme Inc.". Then a string distance comparison to ascertain whether the subject matches the Client company name may be performed.

h. A re-ranking step may resolve any ambiguities/collisions: e.g. if multiple matches are found for any given ontology property, an attempt to find an optimal valid allocation of those unto the knowledge graph is made. This might mean for certain nodes in the graph, a priori probability of being found in the text, as well as an expected arity is specified so that it is also possible to match multiple times against the same template node (e.g. certain attributes we expect to appear zero or once, certain attributes we expect one or more, etc. etc.). This can then be used for scoring the different matches, choosing to keep the highest-scoring match.

2. Each candidate relation for which the classifier emits a probability score higher than a certain pre-specified threshold is then considered a successful mapping unto the contextual ontology. This mapping is then published to the rest of the system by way of a publish-subscribe mechanism ("pub-sub"). Subscribed software components may then use these results in order to affect a mutation to the project brief from which the text originated. This can be done using the local dependency constraints-based Q&A flow mechanism described herein.

Figure 5:
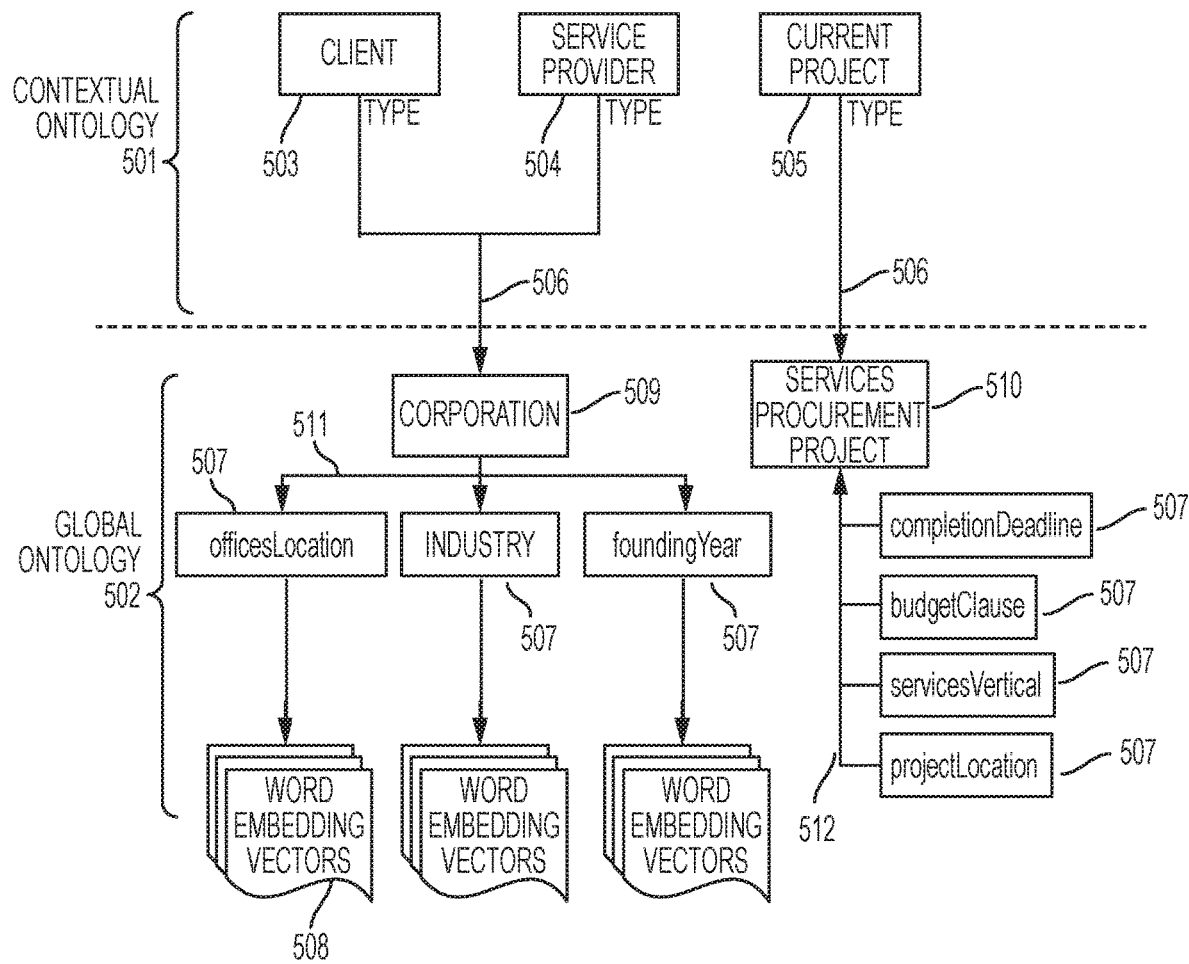
FIG. 5 shows an example of a contextual ontology and its relationship to a global ontology.

FIG. 5 shows an example of a global ontology 502 and a contextual ontology 501. The contextual ontology 501 defines a set of context-specific entities 503, 504, and 505. The context specific entities in the illustrated example are client 503, service provider 504, and current project 505. FIG. 5 also shows relations of interest 506, which illustrate correspondence between a subset of the entities and properties 509 and 510 defined in the global ontology 502 and entities specified in the contextual ontology. FIG. 5 shows a subset of the entities and properties of interest, 509 and 510, and their relationships 511, 512, to other properties 507 in the global ontology 502. The global ontology 502 defines associations of properties 507 (e.g. officesLocation, INDUSTRY, and foundingYear) using one or more word embedding vectors 508, which could be an average (or other function or aggregation) of multiple embedding vectors.

Figure 6:
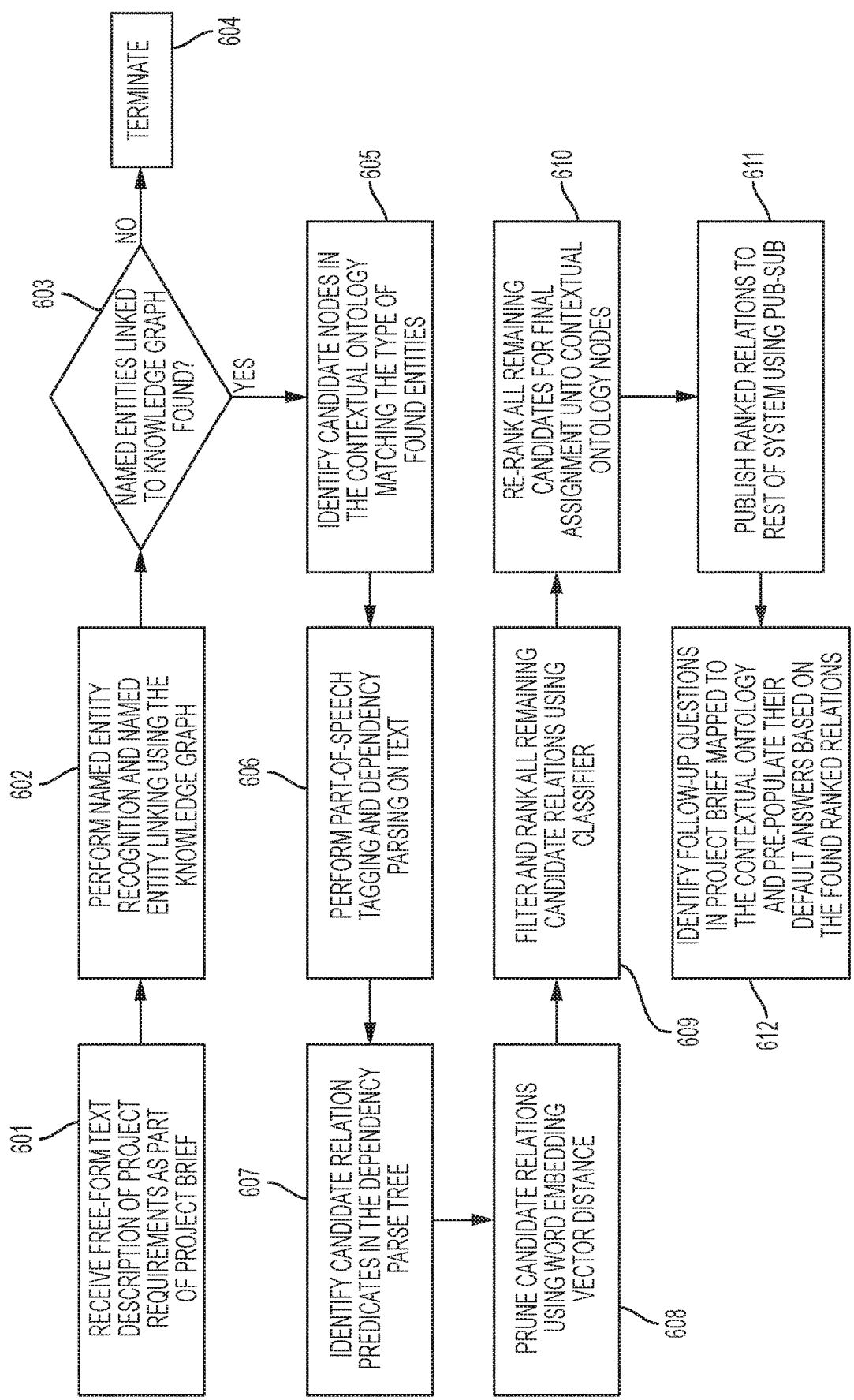
FIG. 6 shows a flowchart diagram depicting the overall architecture of the text-to-ontology mapping.

FIG. 6 shows a flowchart depicting an architecture for text-to-ontology mapping. The process begins upon receipt of a freeform text description of a set of project requirements as part of a Project Brief 601. In this example, a user may be using the system to identify a vendor to perform particular services. The system may maintain vendor profiles containing information regarding properties assigned each vendor. The freeform text received at step 601 is input by a prospective customer in order to describe the project, requirements, and any other information the customer believes is relevant. At step 602 the freeform text is subjected to a named entity recognition and named entity linking process using the knowledge graph. At step 603, if the named entity is not found in a knowledge graph, the process may terminate at step 604. If the named entity is contained within the knowledge graph, step 605 identifies candidate nodes in the contextual ontology matching the type of the found entity. At step 606 a part-of-speech tagging and dependency parsing is conducted on the text. The results of step 606 are utilized in step 607 to identify candidate relation predicates in the depending parse tree. Next, at step 608, candidate relations are pruned using word embedding vector distances. This may be performed utilizing threshold or distance scoring. Step 609 filters and ranks all the remaining candidate relations using a classifier. Next step 610 re-ranks remaining candidates for final assignment onto contextual ontology nodes. Step 611 may publish ranked relations to the system using a publication subroutine. Step 612 identifies follow-up questions in a Project Brief mapped to the contextual ontology and prepopulates default answers based on found ranked relations.

Figure 7:
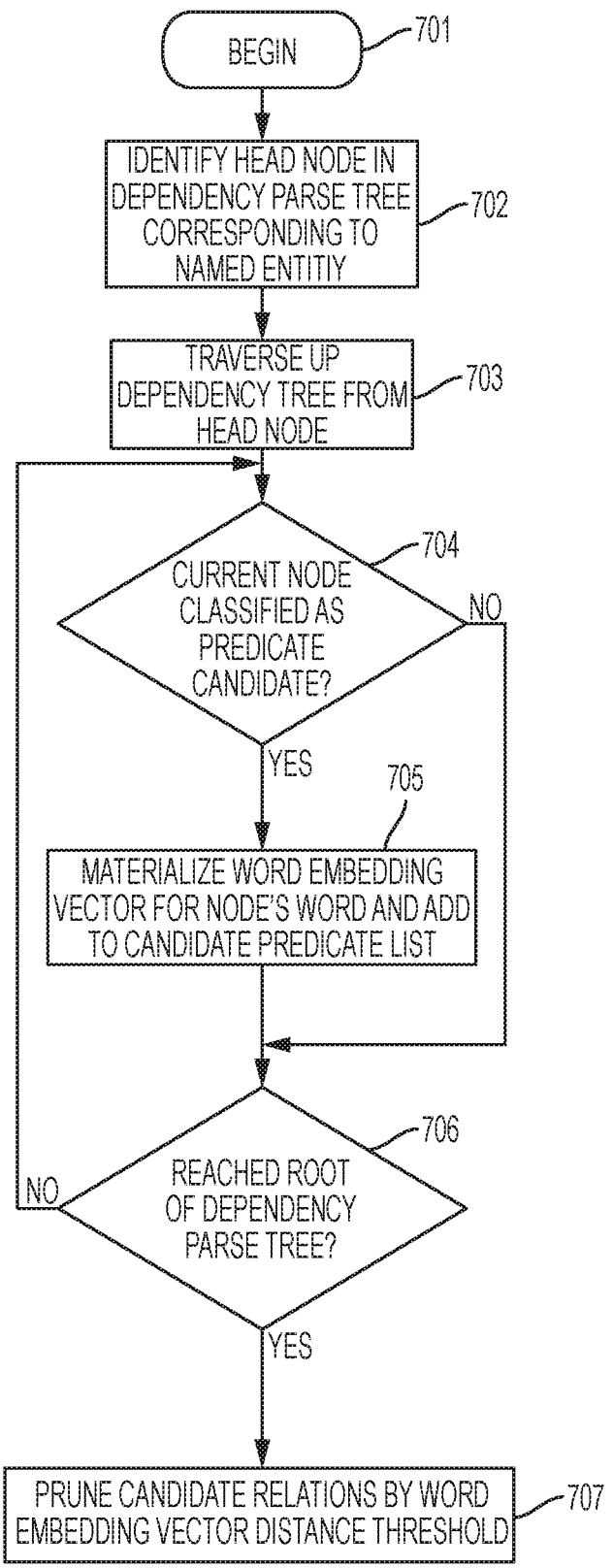
FIG. 7 shows a flowchart diagram depicting the processing of candidate relation predicates as part of the text-to-ontology mapping.

FIG. 7 shows a flow chart diagram depicting the processing of candidate relation predicates as part of the text-to-ontology mapping. The process begins at step 701. Step 702 identifies a head node in a dependency-parsed tree corresponding to a named entity. The process traverses up the dependency tree from the head node at step 703. Query 704 asks whether the current node is classified as a predicate candidate. If yes, step 705 materializes word embedding vector for nodes word and adds to candidate predicate list. If the query 704 results in the current node not classified as a predicate candidate, the flow proceeds to query 706 to determine if the root of the dependency-parsed tree has been reached. Query 706 also follows step 705. If the result of query 706 is yes, the process prunes candidate relations by word embedding vector distance thresholds at 707.

Figure 8:
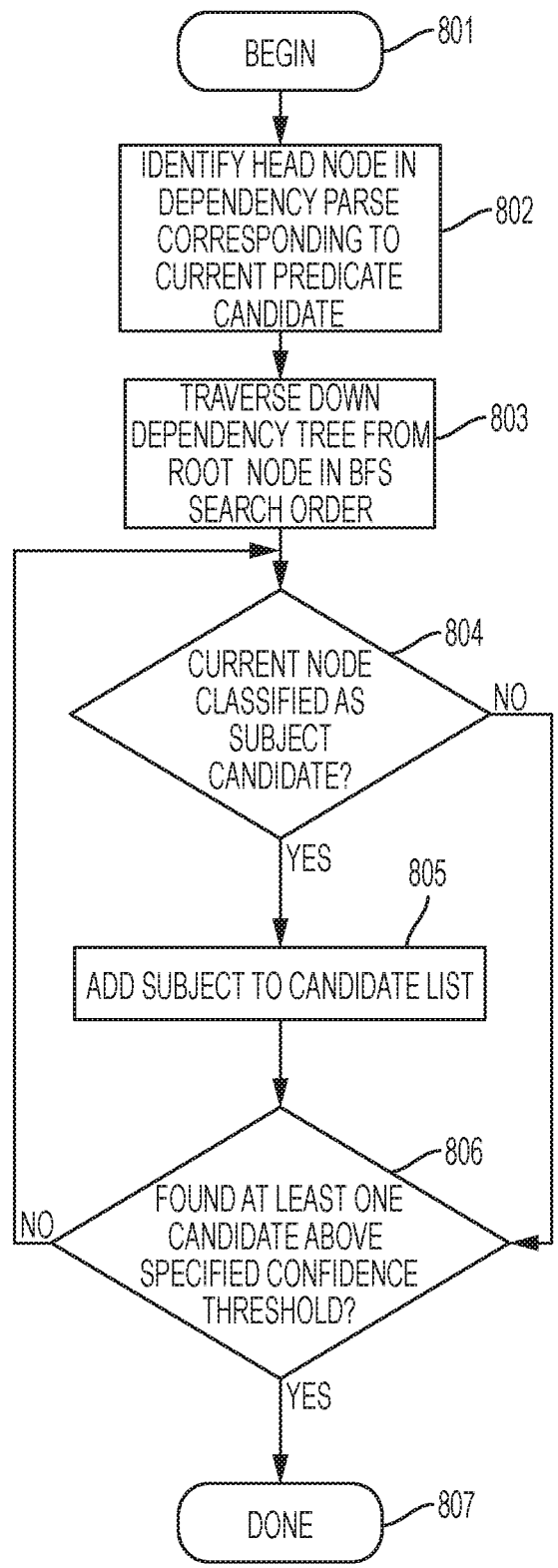
FIG. 8 shows a flowchart diagram depicting the processing of candidate subjects as part of the text-to-ontology mapping.

FIG. 8 shows a diagram depicting the processing of candidate subjects as part of a text-to-ontology mapping. The processing of candidate subject begins at step 801. At step 802 the process identifies a head node in a dependency parse corresponding to the current predicate candidate. Next, at step 803, the process traverses down the dependency tree from the root node, utilizing a breadth-versed search (BFS) process. Query 804 determines whether the current node is classified as a subject candidate. If so, step 805 adds the subject to a candidate list. If the node is not classified as a subject candidate, query 806 determines whether at least one candidate identified above a specified confidence threshold. Query 806 also follows step 805. If there is at least one candidate above a specified confidence threshold, the process is complete at step 807. If there is no candidate above the specified threshold, the next node according to the BFS algorithm, is identified, and that node is provided to query 804 to determine whether it is a subject candidate.

Figure 9:
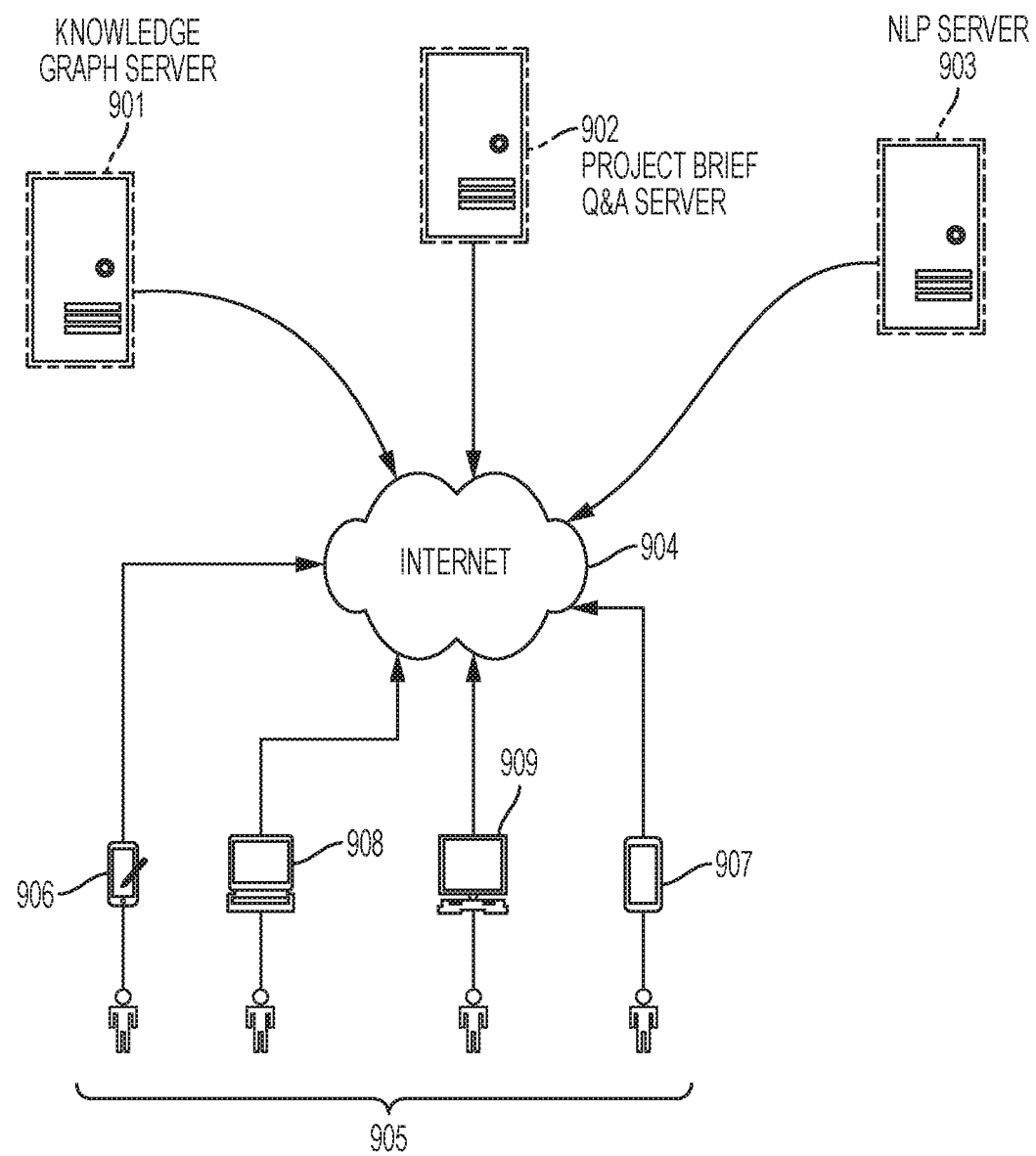
FIG. 9 shows a high-level communication architecture of a Project Brief system using text-to-ontology mapping.

FIG. 9 shows a system architecture for the text-to-ontology mapping. The knowledge graph may reside on a knowledge graph server 901. The knowledge graph server 901 may be connected to a network 904. The network may be the internet or may be a closed network. Project Brief Q&A server 902 is also networked as well as NLP server 903. The users 905 may interact with the system utilizing processor based devices such as smartphones 906, tablets 907, laptop computers 908, or desktop computers 909. The Project Brief Q&A server is responsible for formulating additional questions as needed. NLP server 903 performs the natural language processing required.

The natural language processing can be accomplished by software tools which are available commercially or as open source libraries. Useful software tools include:

1. NLTK [http://www.nitk.org/]—A Python-based Natural Language Processing (NLP) open source library. Provides extendible implementations for basic NLP processing which may include sentence segmentation, word tokenization, part-of-speech tagging, shallow parsing ("chunking"), and text classification.
2. spaCy [https://spacy.io/]—a Python-based Natural Language Processing (NLP) open source library. Provides extendible implementation for an end-to-end NLP processing pipeline, which may be used for: sentence segmentation, word tokenization, part-of-speech tagging, dependency parsing, named entity recognition, and word embedding vectors.
3. rdflib, rdflib-sqlalchemy [http://rdflib.readthedocs.io, https://github.com/RDFLib/rdflib-sqlalchemy]—Python-based open source libraries which may be used for working with ontologies and knowledge graphs using the RDF data format.
4. marisa-trie [https://github.com/pytries/marisa-trie]—a Python-based open source library which may be used for implementing an efficient prefix tree ("Trie") data structure, used for efficient string matching based on prefix ("auto-complete")
5. Pyahocorasick [https://github.com/WojciechMula/pyahocorasick/]—A Python-based open source library which may be used for implementing the Aho-Corasick algorithm for efficient exact match string search based on a fixed dictionary of entries.
6. TensorFlow [https://github.com/tensorflow/tensorflow]—An open source library for numerical computation using data flow graphs, specifically used for writing "Deep Learning" architectures which involve multi-layered neural networks. In the context of NLP it may be used for classification or sequence-to-sequence prediction, by using the word embedding vector representation of words in text.
7. Keras [https://keras.io/]—A Python-based open source library which provides a high-level interface to TensorFLow functionality, speeding up prototyping and development times.

Other tools/software libraries may be used to provide similar or overlapping functionality to the ones mentioned above and are notable in some way:

1. SyntaxNet [https://github.com/tensorflow/models/tree/master/syntaxnet]—An open source library (and trained model) which provides state-of-the-art Dependency Parsing in the context of Natural Language Processing (NLP). Leverages Google's TensorFlow framework.
2. Stanford CoreNLP [http://stanfordnlp.github.io/CoreNLP/]—A Java-based open source library supporting most common Natural Language Processing (NLP) applications, similar to NLTK.

The following is a step-by-step example of an application for an embodiment of a text-to-ontology mapping.

Named Entities, Relation Extraction & Alignment to Contextual Ontology Named Entities Free-form text input from an end-user is processed to identify certain Named Entities in the text. Largely these named entities fall into one of a few distinct categories:

1. "World Fact"-type named entities correspond to Geopolitical entities (Countries, Cities, Continents), Languages, Currencies, Industries, Service Types ("IP Litigation", "Ad Campaign Management", etc.), Expertise (e.g. "Social media", "Chinese IP Law") International Standards, Certificates, recognized industry awards, recognized brands ("Coca-Cola", "Apple"), etc. These entities are known to be ahead of time and stored in the Knowledge Graph, along with a set of surface forms which are indexed especially for the purpose of identifying such entities or known surface forms of such entities that appear in free-form text input. Human editors and automated batch processes may curate and expand the repository of known entities and their associated surface forms.

2. Quantity-type entities may be amounts such as monetary amounts, expressions of time (time ranges or specific dates), percentages or other expressions. Quantity entities may be found in text by way of a set of specific rule matching components, such as pattern matching regular expressions for finding dollar (or other currency) amounts in text, or specifically designed text parsers that can identify date-time mentions in various formats (e.g. "Mar. 12, 2013", "Jan. 15, 2015").

3. "Known Party"-type named entities correspond to specific entities known to be an active party to the current context. In [an] automated request for proposal embodiment these would be mainly: the Client company, the would-be Service Provider company, and the Project itself. These entities may be specified via the Contextual Ontology, which enumerates these parties as well as their possible attributes (properties). A value assigned to attributes may be extracted from text inputs. For example, the attributes "industry experience", "offices location", and "number of employees" may be identified as associated with the Client company. Values may be assigned to those attributes by a process of Relation Extraction and Alignment to the Contextual Ontology, as described below.

Relation Extraction

An explanation of Relation Extraction in general is given in the deepdive subdomain of the Stanford University website at the path specified by /relation_extraction, retrieved Jan. 17, 2017, modified Feb. 23, 2016, the disclosure of which is expressly incorporated herein.

Relation extraction attempts to identify specific semantic relations between named entities of the types described in the previous section, as described in free-form text. This functionality may be implemented in the specific context of a services procurement embodiment:

1. First, identify named entities, of the types mentioned in the previous section, in the end-user provided text. The entity type association for each named entity may be maintained. For example, this type may be: Country, Language, Industry (if the named entity is of the "World Fact" type), it could be "Monetary amount" if the entity is a quantity that was identified as a dollar amount, and it could also be "Client company" if it's of the "Known party" type (for example, in the context of a service procurement embodiment, first-person pronouns such as "we", "us" may be associated with the "Client company" named entity).

2. Each named entity is correlated to an association type. With certain types, there are a priori associated relations that these types may refer to. For example, any geographical/geopolitical entity type (e.g. City, State, Country, as well as Continent) may be associated with a set of relations dubbed "locatedAt" (or "hasOfficesAt"), and "operatesIn". The entity type Industry may be similarly linked to a relation dubbed "hasIndustry-Experience". The entity type Language may be linked to a relation "speaksLanguage". And so forth. A comprehensive set of possible relations of interest are enumerated in advance by a human domain expert, and associated with the appropriate entity types, so that any appearance of a named entity of a given type may "trigger" follow up processing to ascertain whether a specific candidate relation is described in the text for that entity.

3. For all candidate relations that are associated with the types of named entities found in the text, a procedure may be invoked to determine if they occur in the text. This may be done by way of:

a. Traversing the dependency parse tree associated with the specific sentence in which the named entities of interest are found. For certain nodes in the parse tree (pointed to by specific edge labels and/or associated with specific part-of-speech tags, which is specified in advance), which represent the predicate of the relation described in the sentence, the similarity of the word represented in that node against one or more "prototypical" words associated with the candidate relation. This is done using corresponding word embedding vectors associated with words, which allow a continuous measure of similarity between a given query word (e.g. "based") and a prototypical word associated with the relation ahead of time (e.g. "located").

b. Ascertaining the subject of the relation (or the actor)—i.e. whether it is one of the "Known Party"-type entities (Client company, Service Provider Company, the Project itself). This is done by looking to see if a named entity of the "known party" type was also identified in the same sentence, and looking at its place in the sentence, and the edge labels pointing to its representative node in the dependency parse tree.

c. If a subject/actor of the relation was found to be associated with a named entity as described in the previous step, and if the word vector similarity between the predicate word in the sentence and the prototypical word associated with the candidate relation is above a certain threshold, it is deemed a "hit" for the candidate relation.

d. A more refined implementation of step c. may be based on a classifier trained to emit a probability score for a candidate relation. Input features for such a classifier include:

i. The specific relation type under evaluation (e.g. "hasOfficesIn")

ii. The specific type of the named entity based on which the candidate relation of interest is identified (e.g. "Country", "City")

iii. The distance between the prototypical word and the predicate word found in the sentence, e.g. the cosine similarity (distance) between the word embedding vectors associated with those words, respectively.

iv. The set of pair-wise distances between the subject, the predicate, and the named entity based on which the candidate relation of interest in the sentence is identified. This distance is measured as the tree distance in the dependency parse tree between the nodes associated with the head words for the subject, predicate, and object, respectively.

Alignment to Contextual Ontology

For each of the candidate relations found in the text and which was deemed as passing a certain fixed confidence/probability threshold, the relation may be aligned into the contextual ontology. This may be done by:

a. Looking to the subject of the relation. If it is one of the "known party" type entities which are represented in the contextual ontology (e.g. Client company, Service Provider company, the Project), the process may be limited to that entity in the contextual ontology. Otherwise, the relation may be discarded (In practice, the relation may be logged and manually inspected. If useful, it may be annotated and used for training the system in future deployments.)

b. For each attribute (property) of the specific entity in the contextual ontology to which the relation is deemed potentially relevant, an inquiry determines if the relation provides a valid value assignment to that attribute. This may be performed by a set of rules that are a priori associated with each attribute in the contextual ontology. Minimally, such as a rule would include conditioning on the type of the named entity which is the object of the relation (e.g. City, Language, Monetary amount, Expertise, Service Type), and/or on the specific candidate relation type (e.g. "locatedAt", "operatesIn"). This can be visualized as look-up table associated with each attribute in the contextual ontology. For example, for a hypothetical "officesLocation" attribute associated with the Client company entity in the contextual ontology may have the following look-up table:

| officesLocation | | | |
|---|---|---|---|
| Valid named entity types | City | Country | Continent |
| Valid candidate relation types | locatedAt | hasOfficesIn | |

The end-to-end example above highlights a couple of different cases of how such rules may manifest themselves. It should be noted that in many cases there is a simple 1-to-1 correspondence between candidate relation types and attribute types (e.g. "hasIndustryExperience" attribute in the contextual ontology corresponds to a "hasIndustryExperience" relation type), however this is need not be always the case, as exemplified above where multiple relation types may be mapped to a single attribute in the contextual ontology.

Re-Ranking (in Context of Alignment to Contextual Ontology)

When the iterative process of alignment to the contextual ontology is done, there may be multiple candidate relation matches for one or more attributes in the contextual ontology. Some attributes may be required to be "disambiguated" to only assign a single relation from the text and multiple matches to arrive at a single match. This is what the re-ranking phase aims to solve.

An alignment between the candidate relations extracted from the text, and the contextual ontology may be performed as follows:
1. A multiplicity variable is assigned to each attribute in the contextual ontology indicating a number of values that may be assigned to each attribute simultaneously.
2. A multiplicity for an attribute may be defined either as a hard constraint (e.g. "==1", "<3") or as a probability distribution over a discrete domain of values. The latter definition allows a determination of a measure of confidence, or probability, of observing a certain number of value assignments to a given attribute, which may be used in the re-ranking step as described next. This probability distribution is assumed to be known a priori, and in general it may be learned from historical activity on the platform, or dictated by a human domain expert.
3. For each candidate relation matched to a particular attribute in the contextual ontology, an overall match score may be computed as the multiplication of the candidate relation score and the probability of observing the observed number of value assignments into that attribute: Score(Candidate Relation, Contextual Ontology Attribute)=Score(Candidate Relation)*P(Number of Attribute Value Assignments)
4. All relations which do not pass a certain pre-set threshold score value may be pruned. Note that this mechanism effectively allows certain attributes to be limited to a single valid value assignment (by specifying an associated probability distribution with all of its mass allocated to the "1" bin).

End-to-End Example

The following is an example of the operation according to one embodiment.

Consider the following paragraph:

"We are a marketing firm based in Houston, specializing in social media campaign management and re-branding. We've operated mostly in the Telecom and IT industries, and have had Fortune 500 among our past clientele. We seek an IT provider to overhaul our in-office network solution as we scale our organization and wish to allow individuals working remotely to access our various internal shared resources."

The paragraph is first automatically broken down into individual sentences. This may be done using a software library which includes a pre-trained classifier which knows to identify sentence borders in free-form text.

Processing will then commence as follows, for each individual sentence:
1. In the first step, named entity recognition and linking is performed, annotating the text with where certain named entities occur, and their respective type. The named entities may be found in the knowledge graph and contextual ontology by using a string matching index. The result of this automatic process can be visualized as in the following annotation:

[We] are a marketing firm based in [Houston], specializing in [social media], [campaign management] and [re-branding].

We—a "known party"-type named entity, specifically the Client company. (This pronoun may be resolved into a specific entity in the contextual ontology by virtue of the known context in which it is encountered the text, namely the Project Brief which specifies a client company).

Houston—a "world fact"-type named entity, specifically the knowledge graph entity corresponding to the city "Houston, Texas".

social media—a "world fact"-type named entity, specifically the knowledge graph entity (of type "Expertise") corresponding to Expertise in social media.

campaign management—a "world fact"-type named entity, specifically the knowledge graph entity corresponding to the "campaign management" Service Type.

re-branding—a "world fact"-type named entity, specifically the knowledge graph entity corresponding to the "re-branding" Service Type.

2. A queue of possible candidate relations for each "world fact" or "quantity" type named entities, based on that entity's type, may be built. This may automated by consulting look up tables associated with the various types in the knowledge graph. For the above sentence this may be visualized as in the following:

Houston=>Type: City=>Possible Candidate Relations: ["locatedIn", "operatesIn"]

social media=>Type: Expertise=>Possible Candidate Relations: ["hasExpertise"]

campaign management=>Type: Service Type=>Possible Candidate Relations: ["providesService", "seekingService"]

re-branding=>Type: Service Type=>Possible Candidate Relations: ["providesService", "seekingService"]

Figure 10:
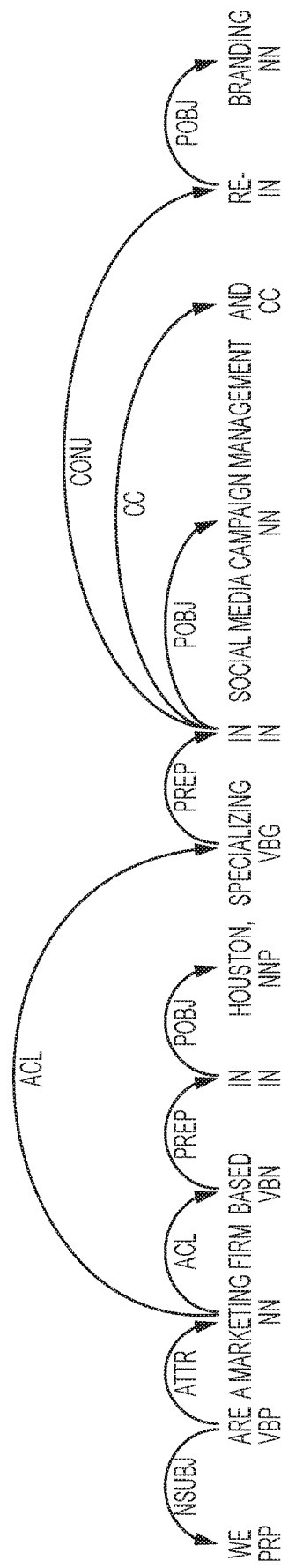
FIG. 10 shows a visualization of a dependency parse tree and part-of-speech tags.

3. The existence of a relation manifested in the sentence may be evaluated for each named entity and a possible associated candidate relation and a confidence score may be generated. This may be done by using the dependency parse tree of the sentence along with part-of-speech tags associated with the individual words in the sentence, and the word embedding vectors that are associated with the candidate relations themselves. The dependency parse tree and the part-of-speech tags for individual words may be obtained automatically using third-party software libraries. The word embedding vectors associated with the candidate relations are pre-specified and assumed known a priori. For the example sentence, the dependency parse tree and part-of-speech tags can be visualized. FIG. 10 shows a visualization of a dependency parse tree and part-of-speech tags for the sentence "We are a marking firm based in Houston, specializing in social media campaign management and re-branding."

Focusing on the (Houston, "locatedIn") pair as a running example for identifying and scoring a candidate relation (for a specific named entity), the node associated with the named entity of interest in the dependency parse is identified, in this case "Houston". Then, traversing backwards from that node, identification of a node corresponding to a predicate of the sentence is attempted. In this example, the node corresponding to the word "in", and in the next traversal step, the node corresponding to the word "based". An outgoing edge label ("prep") is associated with that node, as well as a part-of-speech tag ("VBN"). A look up table is consulted to see if the edge label and/or the part-of-speech tag are members of a pre-determined set associated with the candidate relation being evaluated.

If so, a word embedding vector is established and associated with the word encountered ("based") and the distance to the word embedding vector associated with the candidate relation of interest ("locatedIn") is measured. There may be some variations on this operation:

a. For some relations, there may be more than one word embedding vector associated with the candidate relation, in which case the word vector that is closest to the word encountered for the candidate relation is identified.

b. For some relations, multiple word embedding vectors may be averaged to arrive at a "cluster representative" word embedding vector associated with that candidate relation. Multiple such averages can also be taken and associated with the relation, in which case, as in a. above, the minimal distance to any of them may be taken as the final distance measured.

1. If the distance measured in the above step is below a certain pre-specified threshold, processing of the candidate relation may be continued by traversal of the dependency parse tree, attempting to ascertain the subject of the relation and its type. The inbound dependency parse tree edge label and associated part-of-speech of any named "known party" entities so identified are considered. A look-up table, or a pattern matching dictionary, to decide whether a certain node corresponds to the subject. In this case, the subject is "We", corresponding to the Client company entity in the contextual ontology, and is pointed to by the "nsubj" edge label of the dependency parse tree. It is also associated with the "PRP" part-of-speech tag, signifying a "personal pronoun". This combination of part-of-speech tag, dependency parse tree edge label, and the type of the named entity associated with the word in that node, are used as the context features to evaluate whether this is truly the subject of the candidate relation. This decision can be made by a set of pattern matching rules (e.g. a look up table), or by training a binary classifier such as a logistic regression model over a set of pre-annotated examples.

2. If the subject is found to be one of the "known party" type named entities in the above step, the entire candidate relation, represented now as a tuple of the form (Relation type, object entity, subject entity) is added to the list of candidate relations to be aligned against the contextual ontology. In this example the candidate relation will be represented conceptually as: (Relation<locatedIn>, Entity<Client company>, Entity<Houston>).

3. All such candidate relations are then aligned against the contextual ontology in accordance with an "Alignment to contextual ontology" and "Re-ranking" process as described herein. The output of the process may then be an association between certain candidate relations, and between certain attributes in the contextual ontology. In this example, the process for associating the "officesLocation" attribute of the Client company in the contextual ontology to the "locatedIn" candidate relation extracted from the sentence is made.

What is claimed is:

1. A method to match properties to requirements using text-to-ontology mapping for automatic extraction of structured information from free-form text provided by a user comprising the steps of:

defining a knowledge graph and an ontology associated with said knowledge graph based on a plurality of candidate data sets;

generating a taxonomy of named entities contained in said knowledge graph correlated to relations of said named entities and meta-data associated with said named entities;

defining a contextual ontology from said candidate data sets, wherein said contextual ontology facilitates a structured representation of parameters of interest in free-form text input context;

generating semantically-meaningful dense word embedding vectors associating a set of language-specific text-matching attributes with nodes in said ontology associated with said knowledge graph and nodes in said contextual ontology and said knowledge graph;

receiving a search query, including user provided free-form text;

analyzing said user provided free-form text of said search query by performing part-of-speech tagging and dependency parsing on said user provided free-form text of said search query;

performing named entity recognition and named entity linking on said user provided free-form text of said search query to associate parts of said user provided free-form text of said search query with known named entities described in said knowledge graph;

performing a semantic parsing of said user provided free-form text of said search query, extracting semantic relations by traversing a dependency parsed tree and applying a classifier to detect mappings between phrases in said user provided free-form text of said search query and nodes in said contextual ontology;

scoring detected mappings against a plurality of candidate data sets;

assigning one or more word embedding vectors to named entities;

identifying a node in said dependency parsed tree which overlaps a corresponding named entity token in said user provided free-form text of said search query which is the least distance from a root of the parsed tree corresponding to said identified named entity;

traversing the dependency parsed tree upward from said node and establishing a candidate relation predicate by materializing a word embedding vector corresponding to each word encountered along a path to said root;

determine a minimum distance between any of the embedded word vectors and a word vector associated with the named entity wherein said minimum distance is used to determine similarities and confidence scores between words;

backtracking from the root of the tree and traversing down each sub-tree of the dependency parsed tree, in breadth-first search (BFS) order; and collecting any word found which is classified as a subject above a certain pre-defined confidence score threshold.

2. The method according to claim 1 further comprising the step of:

processing named entity to ontology associations to resolve ambiguities and prune matches, to arrive at a context-specific structured representation of said user provided free-form text of said search query.

3. The method according to claim 1 further comprising the steps of:

extract named entities from said user provided free-form text of said search query;

ascertain semantic relations between extracted named entities and other constituents of the user provided free-form text of said search query signifying an action (predicate) and a subject;

map said semantic relations to parameters in a contextual ontology.

4. The method according to claim 1 wherein said contextual ontology comprises a graph-based representation of properties of a client entity, a vendor entity, and project requirements.

5. The method according to claim 1 further comprising the step of tokenization of said user provided free-form text of said search query.

6. The method according to claim 5 wherein said step of part-of-speech tagging uses a trained conditional random field model.

7. The method according to claim 6 further comprising the step of shallow parsing said user provided free-form text of said search query and applying text classification.

8. The method according to claim 7 further comprising the step of normalizing phrases identified by said step of shallow parsing.

* * * * *